(12) United States Patent
Ahn

(10) Patent No.: US 7,692,349 B2
(45) Date of Patent: Apr. 6, 2010

(54) DIRECT DRIVE MOTOR FOR WASHING MACHINE AND METHOD OF MANUFACTURING THE SAME

(75) Inventor: In Geun Ahn, Changwon-si (KR)

(73) Assignee: LG Electronics Inc., Seoul (KR)

( * ) Notice: Subject to any disclaimer, the term of this patent is extended or adjusted under 35 U.S.C. 154(b) by 403 days.

(21) Appl. No.: 11/705,823

(22) Filed: Feb. 14, 2007

(65) Prior Publication Data

US 2007/0216250 A1     Sep. 20, 2007

(30) Foreign Application Priority Data

Feb. 15, 2006    (KR) .................. 10-2006-0014756

(51) Int. Cl.
*H02K 1/28*     (2006.01)
(52) U.S. Cl. ............... 310/156.43; 310/156.26
(58) Field of Classification Search ............ 310/156.26, 310/156.43
See application file for complete search history.

(56) References Cited

U.S. PATENT DOCUMENTS 5,907,206 A * 5/1999 Shiga et al. ............ 310/156.05

6,396,190 B1 * 5/2002 Ahn et al. .................. 310/261
6,998,742 B2 * 2/2006 Yamaguchi et al. ........... 310/81
2006/0113857 A1 * 6/2006 Honkura et al. ........ 310/156.43

FOREIGN PATENT DOCUMENTS

| DE | 10 2004 017 507 A1 | 10/2005 |
|---|---|---|
| DE | 10 2004 017 157 B4 | 4/2007 |
| EP | 1 263 116 A2 | 12/2002 |
| EP | 1 536 543 A1 | 6/2005 |

OTHER PUBLICATIONS

German Office Action dated Aug. 27, 2008.

\* cited by examiner

*Primary Examiner*—Dang D Le
(74) *Attorney, Agent, or Firm*—KED & Associates, LLP

(57) ABSTRACT

A direct drive motor for a washing machine and a method of manufacturing the same are provided. The motor may include a stator having a winding part with a coil wound thereon, a rotor frame including a side wall part and a rear wall part, the rotor frame being connected to a shaft that drives a drum of a washing machine, and a permanent magnet provided at an inner surface of the side wall part of the rotor frame. The permanent magnet may be formed of a resin material, with a plurality of magnetic poles that alternate in a circumferential direction to form a sine wave magnetization pattern. Such a direct drive motor may reduce cogging torque, noise and vibration.

9 Claims, 10 Drawing Sheets

DIRECT DRIVE MOTOR FOR WASHING MACHINE AND METHOD OF MANUFACTURING THE SAME

This application claims the benefit of the Korean Patent Application No. 10-2006-0014756, filed on Feb. 15, 2006, which is hereby incorporated by reference as if fully set forth herein.

BACKGROUND OF THE INVENTION

1. Field of the Invention

The present invention relates to a washing machine, and more particularly, to a direct drive motor for a washing machine and method of manufacturing the same. Although the present invention is suitable for a wide scope of applications, it is particularly suitable for enhancing a configuration of a rotor of the direct drive motor.

2. Discussion of the Related Art

Generally, a pulsator type washing machine is a product that removes various dirt from clothes, linen and the like using detergent emulsification, a frictional power of water current, an impact power of a pulsator, etc. In particular, the pulsator type washing machine performs a washing process in a manner of automatically setting the washing method by detecting a quantity and type of a laundry using a sensor, supplying water to a level suitable for the detected quantity and type of the laundry, and then executes the washing process under a control of a microcomputer.

In a drum type washing machine, while a detergent, water and laundry are provided within a drum, a driving force of a motor is transferred to the drum to rotate. So, a washing is performed using a frictional force between the rotated drum and the laundry. Hence, the drum type washing machine is advantageous in preventing the laundry from being damaged and raveled with each other. And, the drum type washing machine has a washing effect of beating and rubbing the laundry.

Drum type washing machines according to a related art are classified into an indirect drive type washing machine of which drum is rotated by a motor indirectly transferring its driving force to the drum via a belt that connects a motor pulley and a drum pulley together and a direct drive type washing machine of which drum is directly connected to a rotor of a motor to be rotated.

In this case, the indirect drive type washing machine, in which the driving force of the motor is transferred via the belt connecting the motor and drum pulleys together, considerable noise and energy loss takes place in the course of transferring the driving force.

In order to problems of the related art drum type washing machine, a motor is assembled to a rear wall of a tub to directly transfer its driving force to a drum. So, the direct drive type drum type washing machine becomes more popular.

A configuration of a direct drive type drum type washing machine according to a related art is explained as follows.

FIG. 1 is a cross-sectional diagram of a direct drive type drum type washing machine according to a related art.

Referring to FIG. 1, a direct drive type drum type washing machine according to a related art consists of a tub 2 provided within a cabinet 1, a drum 3 provided within the tub 2, a washing shaft 4 connected to the drum 3 to transfer a driving force of a motor 5 to the drum 3, an a bearing (not shown in the drawing) provided to an outer circumference of each end of the washing shaft 4.

A door 21 is provided to a front side of the cabinet 1 and a gasket 22 is provided between the door 21 and the tub 2.

A hanging spring 23 is provided between an inside of a topside of the cabinet 1 and an upper outer circumference of the tub 2 to support the tub 2. And, a frictional damper 24 provided between an inside of a bottom side of the cabinet 1 and a lower outer circumference of the tub 2 to attenuate vibration of the tub 2 in executing a dewatering cycle.

In this case, the motor 5 consists of a stator 7 assembled to a rear wall portion 200 of the tub 2 and a rotor 6 configured to enclose the stator 7. A driving force of the rotor 6 is directly transferred to the drum 3 via the washing shaft 4. Namely, the drum 3 is driven according to a direct drive type without a power transmission via separate pulley or belt configuration.

A configuration of a direct drive type motor for a washing machine according to a related art is explained with reference to FIG. 2 and FIG. 3 as follows.

FIG. 2 is a perspective diagram of a stator of the motor shown in FIG. 1 and FIG. 3 is a perspective diagram of a rotor of the motor shown in FIG. 1.

Referring to FIG. 2 and FIG. 3, the motor 5 consists of the stator 7 and the rotor 6. If an electric power is applied to the motor 5, a rotational magnetic field is generated between a coil 8 wound on the stator 7 and a permanent magnet 16 to rotate the rotor 6.

In this case, the stator 7 consists of the coil 8, a stator core 10 provided with a plurality of teeth 9 having the coil 8 wound thereon and an insulator 12 insulating the coil 8 and the stator core 10 from each other. In particular, the stator 7 is fixed to the rear wall portion of the tub 2 via bolts or the like fitted into locking holes 11, respectively.

Alternatively, although FIG. 2 shows that the locking holes 11 are provided to the insulator 12 and the stator core 10, the locking holes 11 can be provided to the insulator 12 only in a manner of configuring the stator core 10 to have protrusions projected inward in a radial direction for the locking holes.

The rotor 6 is provided to enclose the stator 7 and is connected to the washing shaft 4 connected to the drum 3 by perforating the tub 2. Namely, the drum 3 is rotated by a rotation of the rotor 6 via the washing shaft 4.

And, a bearing housing (not shown in the drawings) is provided between a rear wall portion 200 of the tub 2 and the stator 7 to rotatably support the washing shaft 4.

Configurational details of the rotor 6 are explained as follows.

First of all, the rotor 6 consists of a rotor frame 15 and a permanent magnet 16. The rotor frame 15 consists of a sidewall part 13 and a backside wall part 14. A perforated hole is provided to a central portion of the backside wall part 14. And, a washing shaft passes through the perforated hole to directly drive a drum. Moreover, the permanent magnet 16 is provided in a circumferential direction within the sidewall part 13 of the rotor frame 15.

In this case, a magnetic path needs to be formed to enable a magnetic flux generated from the permanent magnet 16 to pass through. Yet, if the rotor frame 15 is formed of a magnetic substance, it is unnecessary to include a magnetic back yoke to form a magnetic path therein. Namely, the sidewall part 13 of the rotor frame 15 plays a role as a back yoke for forming the magnetic path, whereby the rotor frame 15 and the back yoke can be formed on one body.

Meanwhile, a connector 30 connecting the washing shaft 4 and the rotor frame 15 together is provided in one body of the rotor frame 15 to the perforated hole. Alternatively, the connector 30 is assembled to the rotor frame 15 using a separate locking means.

In this case, a serration 31 is provided to a central part of the connector 30 to transfer a driving force of the rotor 6 to the washing shaft 4 by the serration joint with the washing shaft 4.

A plurality of cooling fins 16, cooling holes 17 and drain holes 18 are provided in a circumferential direction to the backside wall part 14 of the rotor frame 15, thereby preventing the stator from being overheated and facilitating water to be drained.

A plurality of embossed parts 19 are provided to the backside wall part 14 of the rotor frame 15 to raise rigidity of the rotor frame 15, and a step sill 20 is provided to an inner side of the sidewall part 13 of the rotor frame 15 in a circumferential direction to support the permanent magnet 16.

FIG. 4 is a graph of a magnetization waveform of a permanent magnet of a direct drive type motor according to a related art.

In the related art, a permanent magnet is separated into a plurality of pieces to be assembled to an inner surface of a sidewall of a rotor in a circumferential direction. And, the permanent magnetic pieces are magnetized to enable N and S polarities to alternate along the circumferential direction.

So, the permanent magnet, as shown in FIG. 4, has a waveform close to a square wave according to an angle to generate a point at which the magnetic polarity abruptly changes according to the circumferential direction of the inner surface of the sidewall of the rotor.

In general, a related art washing machine motor is the BLDC (brushless DC motor) and a rotational speed of a rotor is controlled by an inverter. In particular, an AC voltage of a power is converted to a DC voltage, converted to a 3-phase (u,v,w) AC voltage, and then applied to the motor.

The voltage applied to the motor has a PWM (pulse width modulation) waveform, and an amplitude and frequency of the voltage applied to the motor are adjusted by controlling a size of a duty ratio.

Meanwhile, the inverter is driven according to a square wave drive or a sine wave drive, which is discriminated according to whether the drive has a conduction angle 180° or a 120° conduction angle in six type switching sequences of a 3-phase inverter.

Since a harmonic component is small in case of the 120° conduction angle, a waveform gets closer to the sine wave. So, the sine wave drive is more popular for a washing machine motor drive in general.

However, in a motor driven by the sine wave drive and having a permanent magnet magnetized in a square waveform, a cogging torque and the like are generated due to the square waveform magnetization of the motor. And, this problem causes a torque ripple that pulsates as well as a drive torque for driving the motor. So, motor efficiency is lowered but vibration and noise are raised.

In particular, the cogging torque is generated from an abrupt fluctuation of a mutual reaction between the permanent magnet 16 and a winding part having the coil wound thereon while the motor is driven. And, the cogging torque is raised if a magnetized pattern of the permanent magnet gets closer to the square wave.

So, in a direct drive motor of a general washing machine for a sine wave drive, many efforts have been made to solve the problem of the cogging torque raised due to the square wave magnetization of the permanent magnet and the corresponding vibration and noise problems.

Meanwhile, such a general permanent magnet as an AlNiCo magnet, a ferrite magnet and the like is normally formed by sintering or the like. So, the magnet is considerably heavy to cause an energy loss attributed to an inertial force and difficult to be assembled to a rotor frame.

Meanwhile, a number of permanent magnets need to be attached to the rotor frame in a circumferential direction. So, the magnet attaching process is complicated and a reliability of the attachment is degraded.

SUMMARY OF THE INVENTION

Accordingly, the present invention is directed to a direct drive motor for a washing machine and method of manufacturing the same that substantially obviate one or more problems due to limitations and disadvantages of the related art.

An object of the present invention is to provide a direct drive motor for a washing machine and method of manufacturing the same, by which a direct drive motor convenient for use can be provided in a manner of reducing a cogging torque, noise and vibration considerably using a permanent magnet having sine waveform magnetization.

Another object of the present invention is to provide a direct drive motor for a washing machine and method of manufacturing the same, by which the motor can be provided with good efficiency and manufacturing facilitation using a permanent magnet formed of a synthetic resin based substance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a direct drive motor for a washing machine according to the present invention includes a stator having a winding part having a coil wound thereon, a rotor frame including a sidewall part and a rear wall part, the rotor frame connected to a washing shaft to directly drive a drum, and a permanent magnet provided to an inner surface of the sidewall part of the rotor frame, the permanent magnet formed of a resin to have a plurality of magnetic poles alternate in a circumferential direction in a sine wave pattern substantially. In this case, the sidewall part of the rotor frame is able to play a role as a back yoke for forming a magnetic path.

Preferably, the direct drive motor further includes a back yoke provided between the inner surface of the sidewall part of the rotor frame and the permanent magnet in the circumferential direction.

More preferably, the back yoke includes the sidewall part of the rotor frame and wherein the back yoke is formed of a magnetic substance to form a magnetic path.

And, the sidewall part of the rotor frame is formed of a magnetic substance for forming a magnetic path and wherein the back yoke is formed of a non-magnetic substance.

In this case, the back yoke is configured to cover the permanent magnet in a direction of an opening of a rotor in which the stator is inserted in order to prevent the permanent magnet from being damaged when the rotor and the stator are assembled together.

And, the back yoke is configured to enclose the permanent magnet except a portion of the permanent magnet opposing the stator.

Moreover, the back yoke is formed by insert injection molding of the rotor frame. If so, the permanent magnet can be more concretely assembled to the sidewall part of the rotor.

Preferably, the permanent magnet is configured flexible to have at least one band shape.

More preferably, the permanent magnet is attached to the inner surface of the sidewall part of the rotor frame.

And, the permanent magnet includes four bands.

Preferably, the permanent magnet is formed by insert injection molding to the inner surface of the sidewall part of the rotor frame.

Preferably, the permanent magnet is formed of a polyamide or polyphenyl based synthetic resin. This is to meet the required rigidity and heat-resistance.

Preferably, the permanent magnet is formed of rare earth element. In particular, the rare earth element particles are mixed within the synthetic resin to form a whole permanent magnet.

In another aspect of the present invention, a method of manufacturing a direct drive motor for a washing machine, in which the direct drive motor includes a stator having a winding part having a coil wound thereon, a rotor frame including a sidewall part and a rear wall part, the rotor frame connected to a washing shaft to directly drive a drum, and a permanent magnet provided to an inner surface of the sidewall part of the rotor frame, includes a permanent magnet assembling step of assembling the permanent magnet formed of a resin to the inner surface of the sidewall part of the rotor frame and a permanent magnet magnetizing step of magnetizing the permanent magnet by inserting a magnetizing yoke within the rotor frame having the permanent magnet assembled thereto to enable a plurality of magnetic poles to substantially alternate in a sine wave pattern in a circumferential direction.

Preferably, in the permanent magnet assembling step, the permanent magnet is attached to a non-magnetic back yoke attached to the inner surface of the sidewall part of the rotor frame.

Preferably, the permanent magnet assembling step includes the steps of assembling the permanent magnet to a non-magnetic back yoke and assembling the back yoke to the inner surface of the sidewall part of the rotor frame.

Preferably, the permanent magnet is formed flexible.

Preferably, in the permanent magnet assembling step, the permanent magnet formed of a synthetic resin containing rare earth elements is inert-injected to the inner surface of the sidewall part of the rotor frame to be attached thereto.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In particular, the respective embodiments of the present invention are explained in detail with reference to FIGS. 5 to 11, and details of the same or like parts of the related art will be omitted in the following description.

First of all, a first embodiment of the present invention is explained with reference to FIGS. 5 to 7 as follows.

Figure 5:
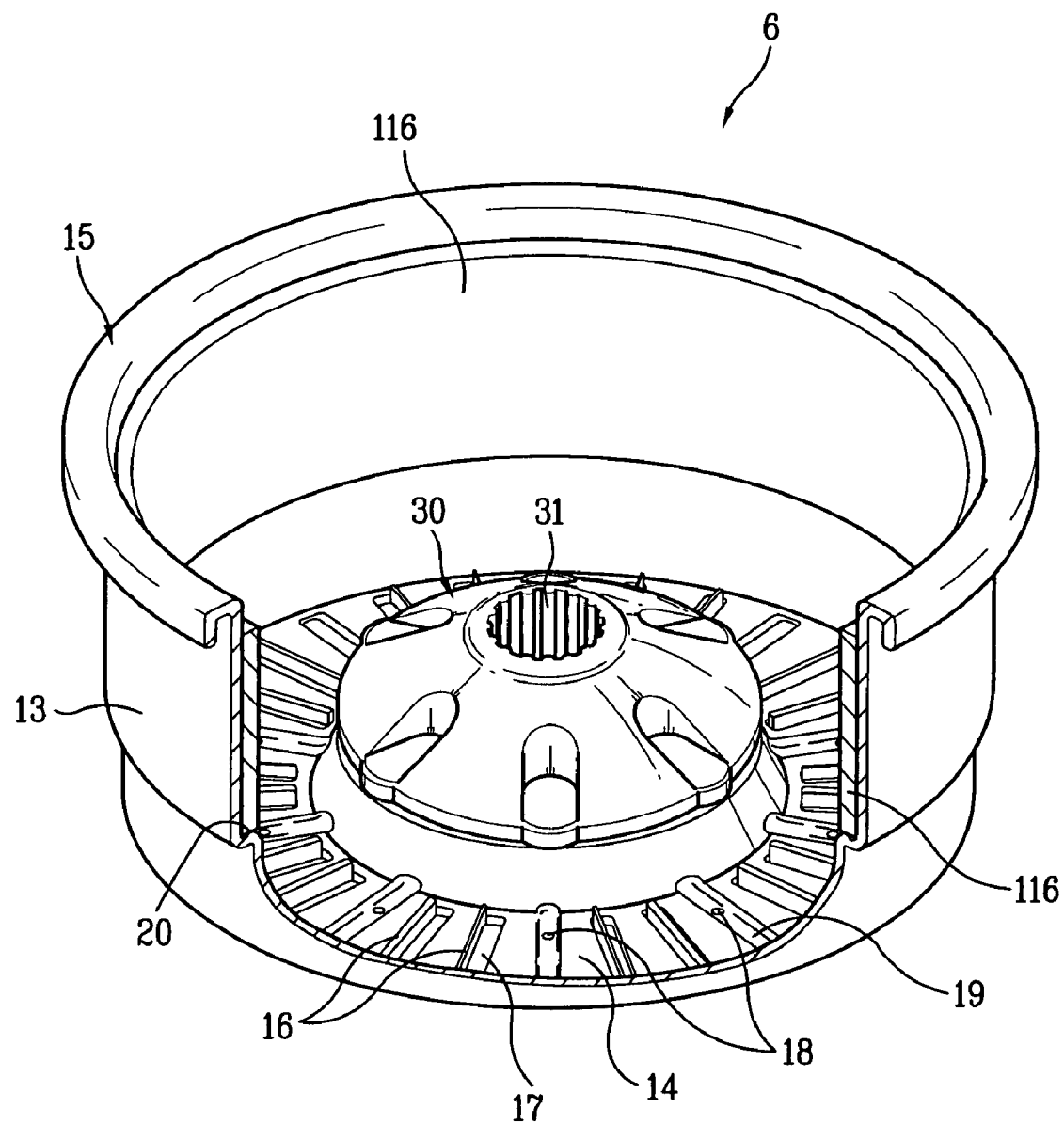
FIG. 5 is a broken perspective diagram of a rotor of a direct drive motor according to one embodiment of the present invention.
Figure 6:
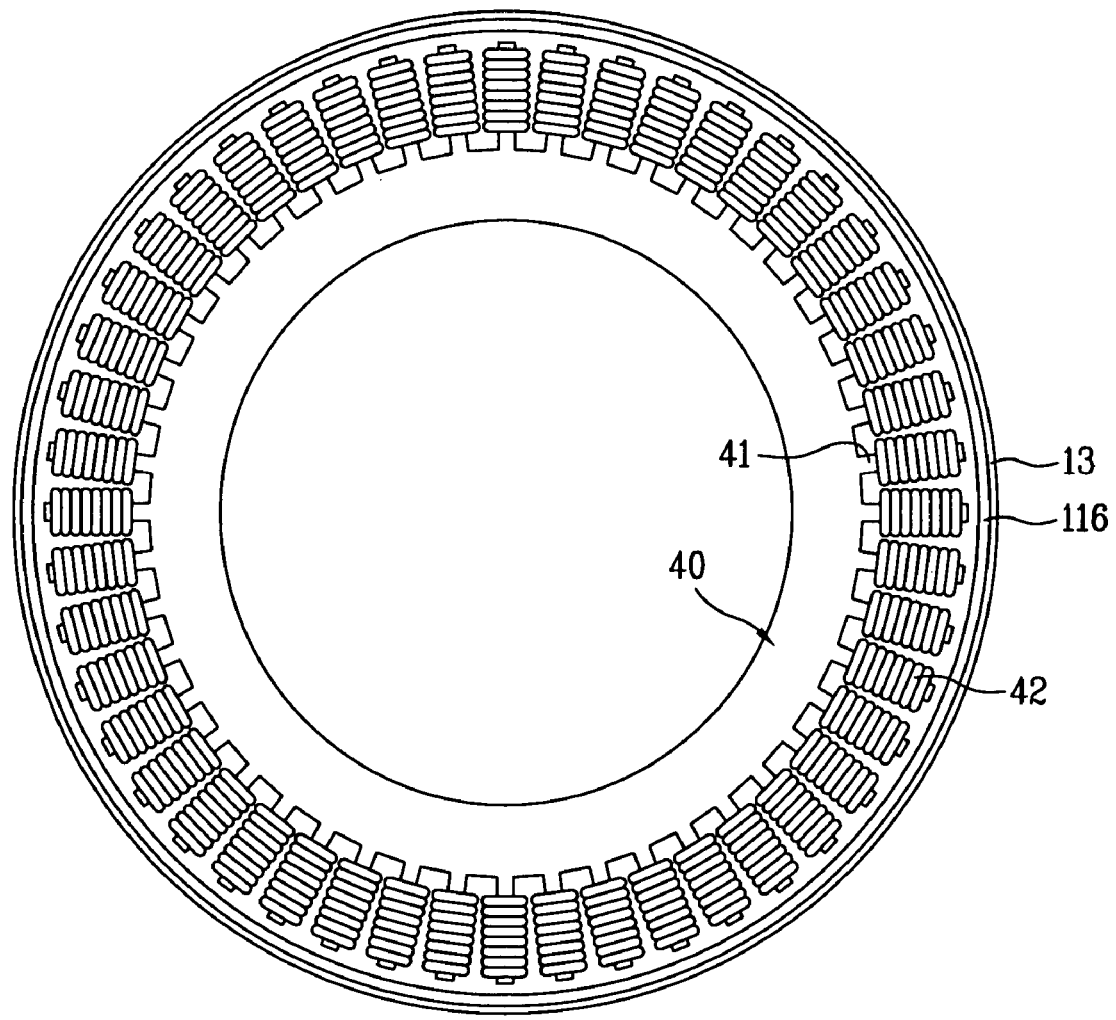
FIG. 6 is a layout of a magnetizing yoke for a magnetization of a direct drive motor according to one embodiment of the present invention.
Figure 7:
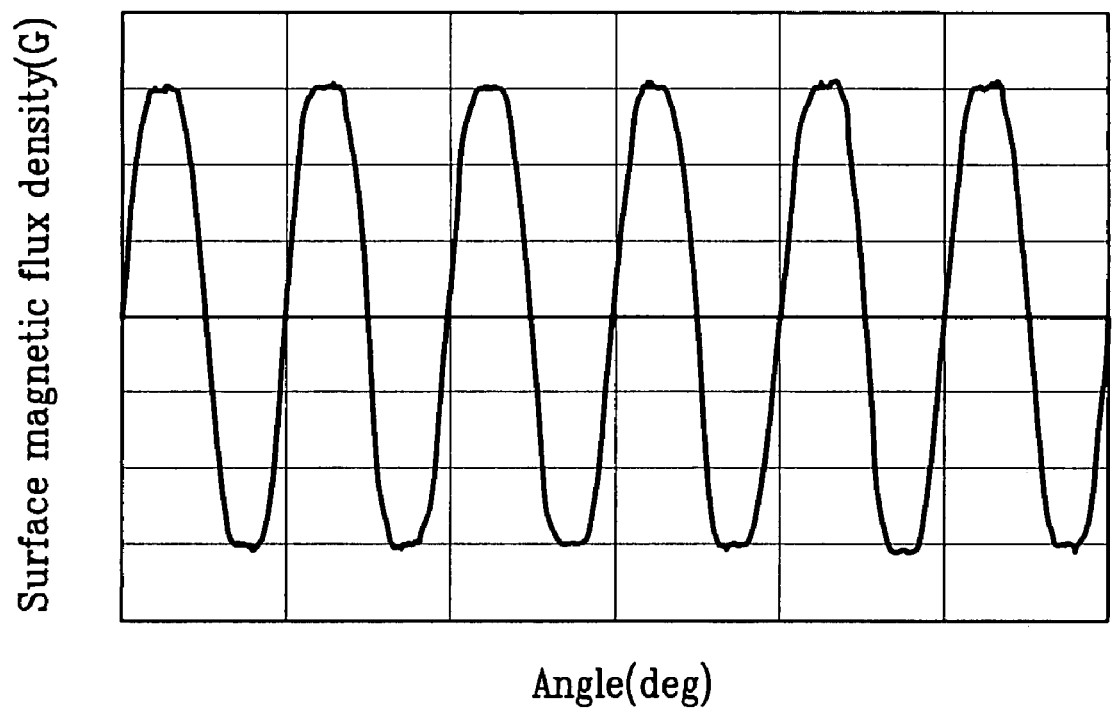
FIG. 7 is a graph of a magnetization waveform of a permanent magnet of a direct drive type motor according to one embodiment of the present invention.

FIG. 5 is a broken perspective diagram of a rotor of a direct drive motor according to one embodiment of the present invention, FIG. 6 is a layout of a magnetizing yoke for a magnetization of a direct drive motor according to one embodiment of the present invention, and FIG. 7 is a graph of a magnetization waveform of a permanent magnet of a direct drive type motor according to one embodiment of the present invention.

Referring to FIG. 5, a configuration of a rotor of a direct drive motor according to a first embodiment of the present invention is similar to that of the related art but differs in a permanent magnet 116.

In the related art, a plurality of pieces are magnetized in to a permanent magnet and then attached to a rotor frame. Yet, in the first embodiment of the present invention, at least one piece, and more preferably, four pieces configure a whole permanent magnet. FIG. 5 shows a permanent magnet 116 including one piece.

In particular, the piece preferably has a band shape. Since the permanent magnet of the present embodiment can be configured flexible, it is able to configure a whole permanent magnet with one to four pieces. Of course, the permanent magnet 16 can be configured with more pieces.

So, since it is unnecessary to configure the permanent magnet to fit an inner curvature of a sidewall part of the rotor frame 15, a product cost of the permanent magnet can be considerably reduced.

A rotor 6 is shown in FIG. 5 without a separate back yoke. Instead, the rotor frame 15, and more particularly, the sidewall part 13 plays a role as a back yoke for forming a magnetic path. So, the rotor frame 15 can be formed in one body by press processing of one steel plate or sheet.

In this case, the back yoke can be considered as built in one body of the rotor frame.

Meanwhile, the permanent magnet of the first embodiment of the present invention can be formed by injection molding in a manner of mixing a natural or synthetic resin with a magnetic component of rare earths. In particular, a permanent magnet separately formed by injection molding is attached to the rotor frame. Alternatively, a permanent magnet and a rotor frame can be formed together by injection molding.

Preferably, the resin for the permanent magnet is the synthetic resin to provide a required rigidity. More preferably, the synthetic resin includes a polyamide or polyphenyl based synthetic resin. Since the permanent magnet is exposed to high temperature, it should have a good heat-resistant property, a good molding property, and a good rigidity. So, such a synthetic resin is suitable for a condition for using the permanent magnet.

In particular, the polyamide based synthetic resin includes PA6, PA66, etc. If a permanent magnet is formed by mixing the polyamide based synthetic resin with a magnetic component of rare earths, the magnetic component will be resistant against a strong magnetic field.

Besides, rare earth elements include Nd, Sm, Y, etc. So, the particles of the permanent magnet including the rare earth elements provide a magnetic force stronger than that of a ferrite or AlNiCo magnet and has a good oxidization property. So, it is able to obtain a specific magnetic force with a small quantity of permanent magnet particles.

In case of using a flexible permanent magnet of the first embodiment of the present invention, it is possible to achieve a magnetization form closer to a sine wave different from that of the ferrite or AlNiCo permanent magnet formed by sintering or the like.

In particular, after the permanent magnet has been magnetized, it is attached to the rotor frame. Alternatively, after the permanent magnet, as shown in FIG. 6, has been attached to the rotor frame, it is magnetized.

In this case, it is able to attach the permanent magnet to the rotor frame using an adhesive agent or the like.

FIG. 6 shows a sidewall part of a rotor frame formed by press processing of a steel plate and a permanent magnet 116 provided to an inner surface of the sidewall part.

The magnetizing yoke 40 is provided with a plurality of teeth 41 in a circumferential direction along an outer circumference and a coil is wound on each of the teeth 41. In particular, it is possible to magnetize magnetic poles of the permanent magnet 116 alternately to correspond to each of the teeth 41 in a manner that a direction of the wound coil alternates.

Figure 1:
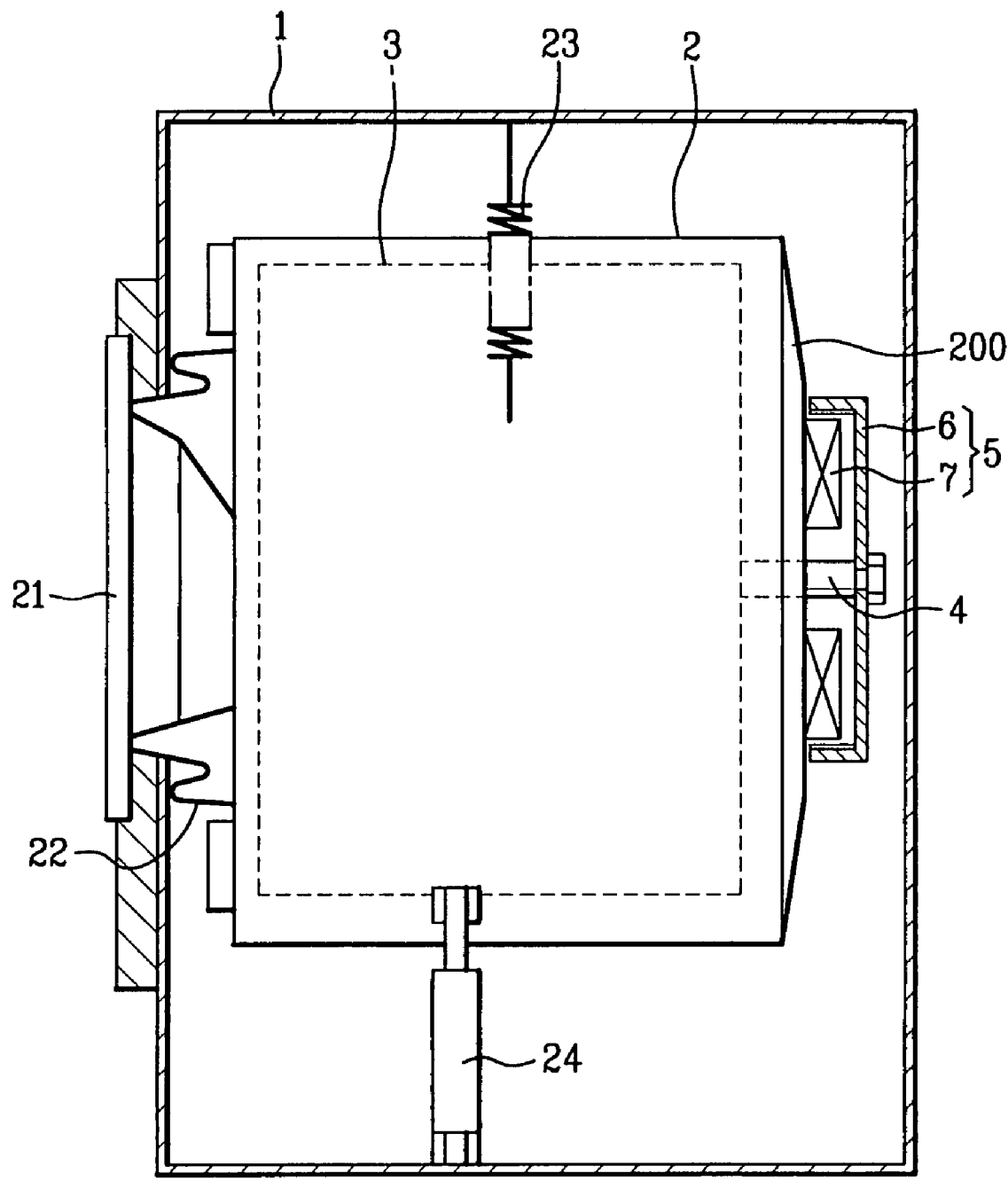
FIG. 1 is a cross-sectional diagram of a direct drive type drum type washing machine according to a related art.
Figure 2:
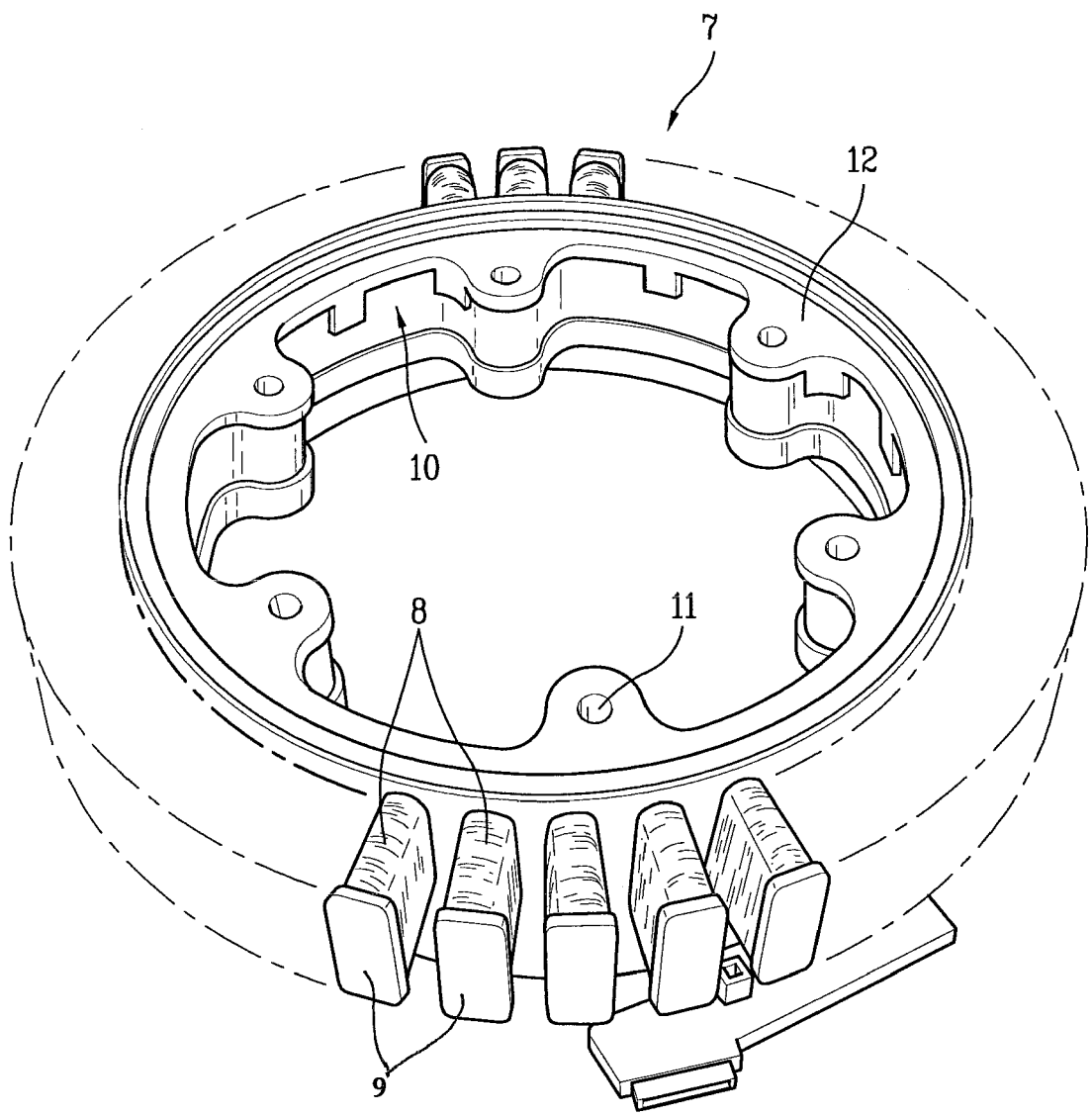
FIG. 2 is a perspective diagram of a stator of the motor shown in FIG. 1.
Figure 3:
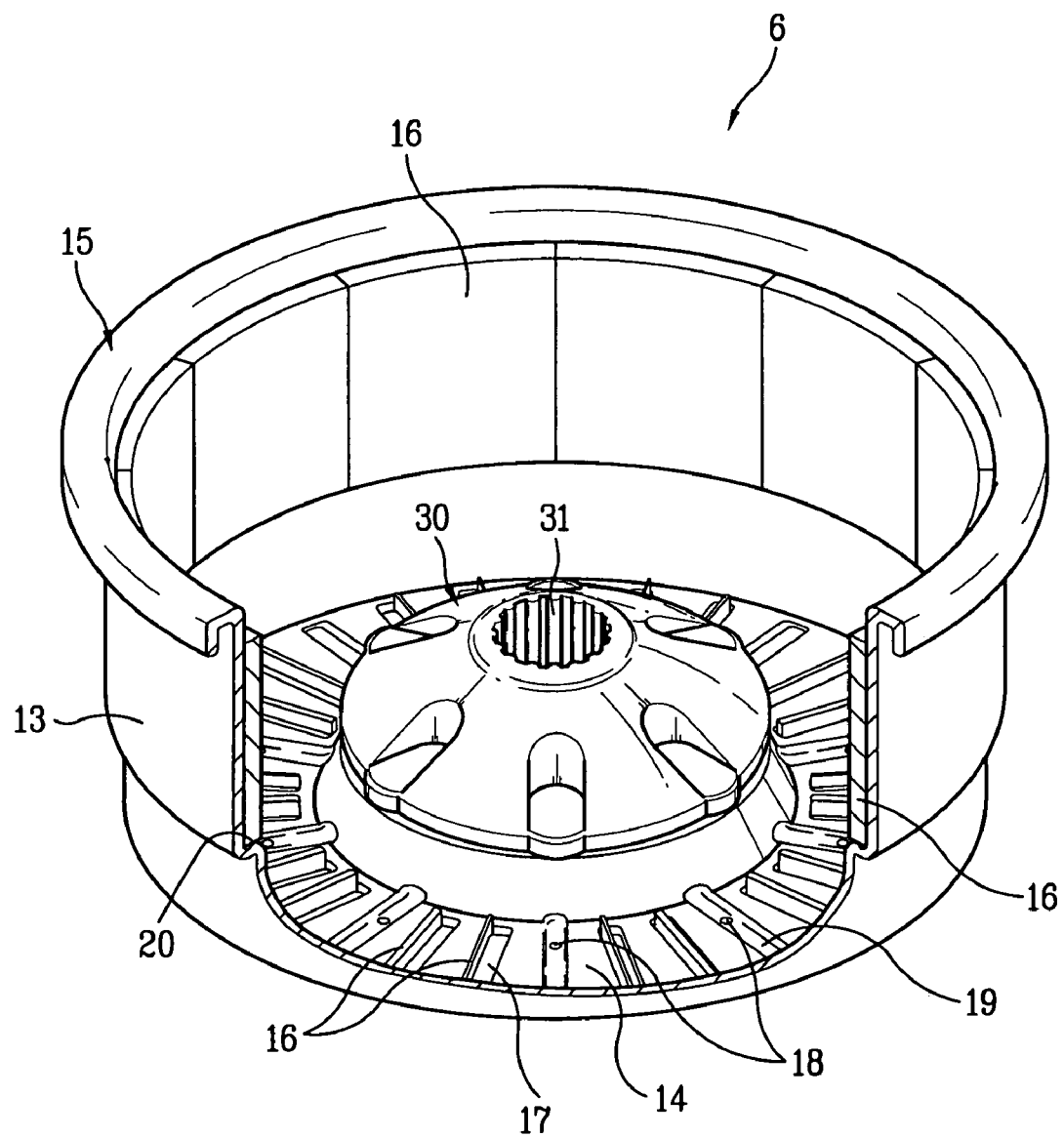
FIG. 3 is a perspective diagram of a rotor of the motor shown in FIG. 1.
Figure 4:
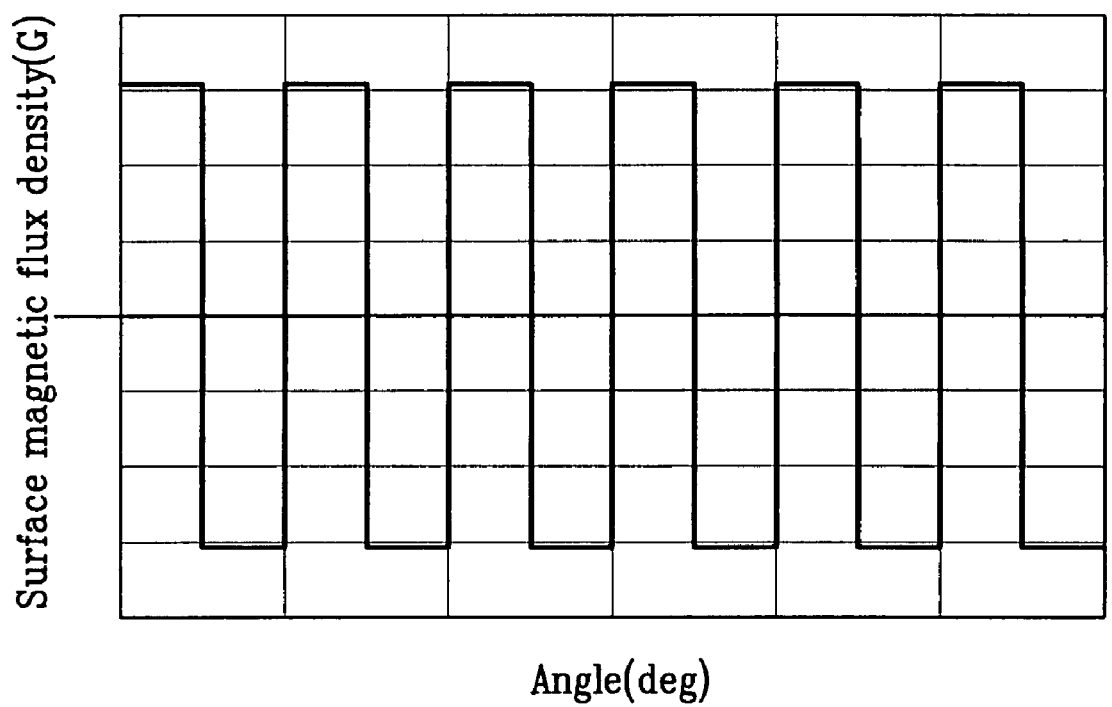
FIG. 4 is a graph of a magnetization waveform of a permanent magnet of a direct drive type motor according to a related art.

In this case, since the permanent magnet of the first embodiment of the present invention includes a flexible rubber or plastic magnet, it is able to configure a magnetization close to a sine wave magnetization shown in FIG. 7 instead of the square wave magnetization shown in FIG. 4.

Hence, the rotor can be configured to simultaneously have the sine wave magnetization of the permanent magnet.

Meanwhile, FIG. 6 shows a permanent magnet having magnetization of 48 magnetic poles. This is attributed to the flexible permanent magnet or the plastic permanent magnet of the present embodiment to magnetize the permanent magnet with more magnetic poles.

Generally, a direct drive motor for a washing machine needs a precise control at a low rotational speed with a high torque. For this, it is more effective with more magnetic poles provided to a permanent magnet. So, the present embodiment brings an effect of increasing the number of magnetic poles in magnetization.

A second embodiment of the present invention is explained with reference to FIG. 8 and FIG. 9 as follows.

Figure 8:
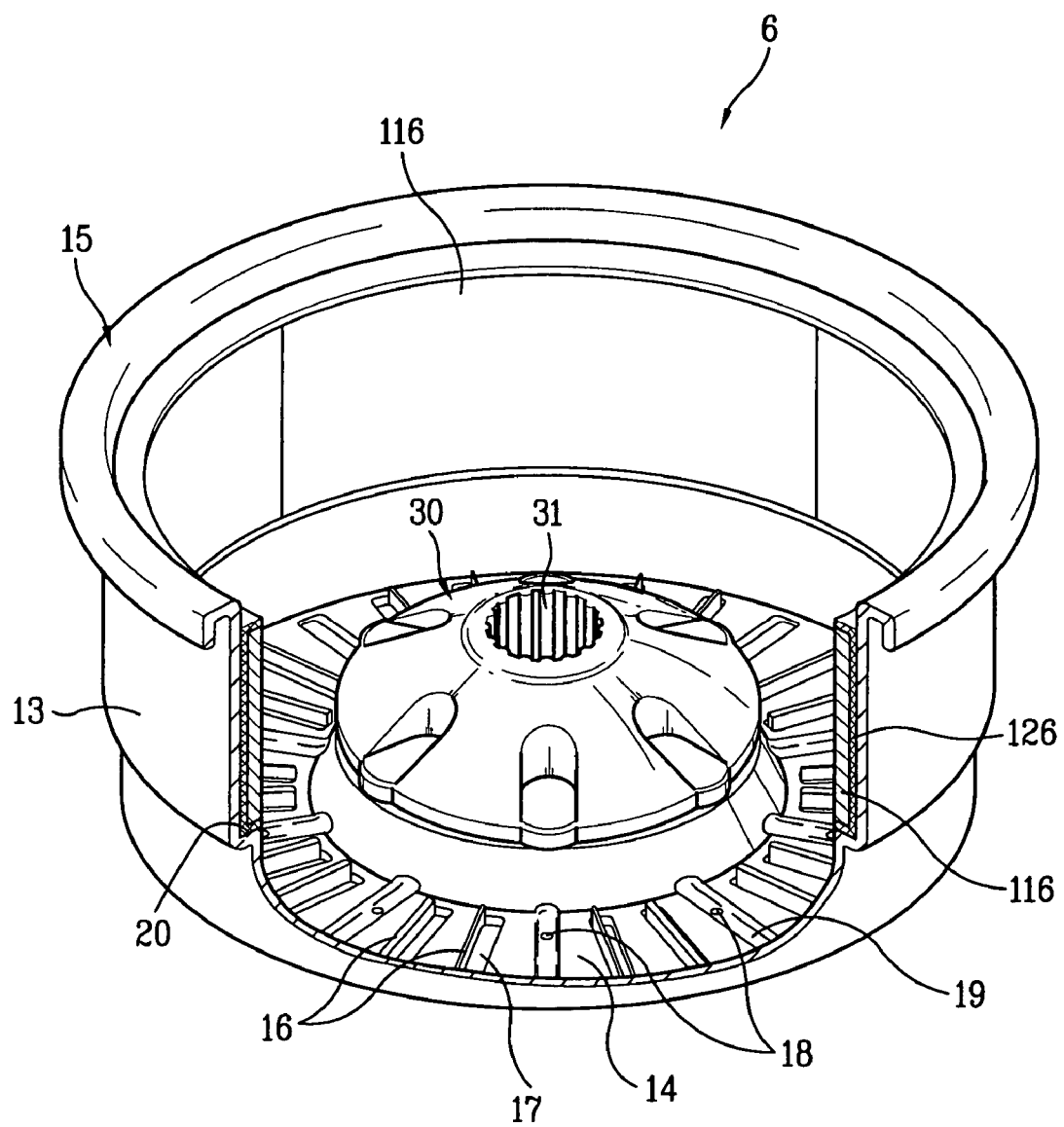
FIG. 8 is a broken perspective diagram of a rotor of a direct drive motor according to another embodiment of the present invention.
Figure 9:
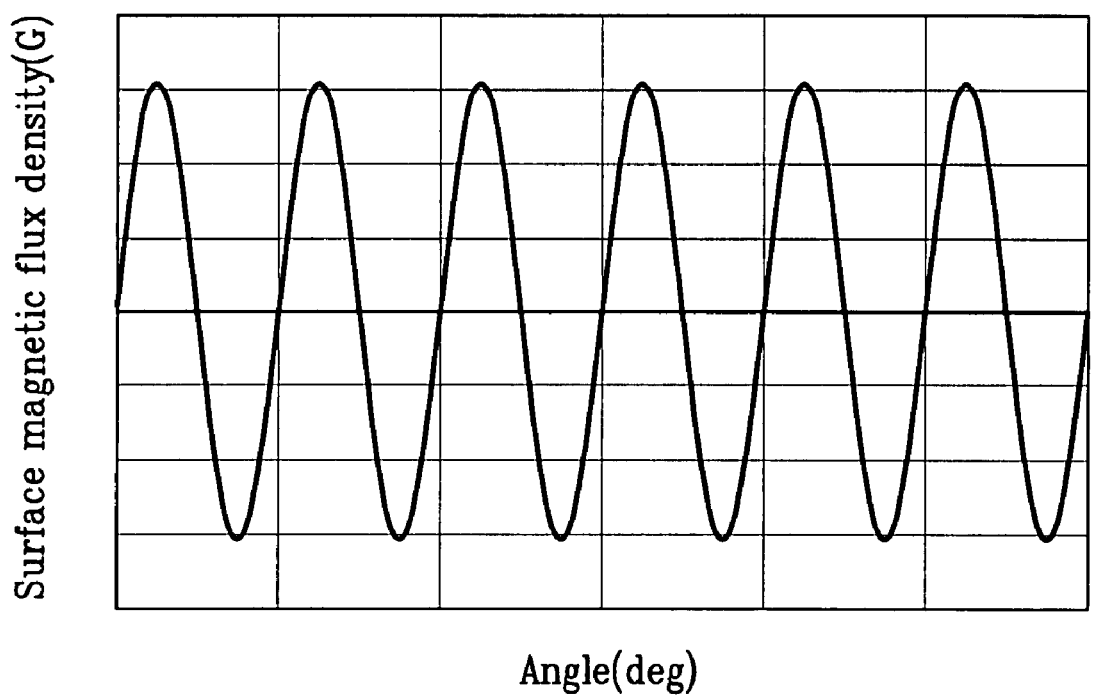
FIG. 9 is a layout of a magnetizing yoke for a magnetization of a direct drive motor according to another embodiment of the present invention.

FIG. 8 is a broken perspective diagram of a rotor of a direct drive motor according to another embodiment of the present invention.

Referring to FIG. 8, a configuration of a rotor of a direct drive motor according to a second embodiment of the present invention is almost equal to that of the first embodiment of the present invention but differs in that a back yoke 126 is provided between a sidewall part of a rotor frame 15 and a permanent magnet 116.

In this case, the back yoke 126 is a non-magnetic body and preferably has a specific magnetic permeability below 100.

The back yoke 126 is capable of playing a role in preventing the permanent magnet 116 from being scattered and can be configured to enclose the permanent magnet except a portion of the permanent magnet opposing a stator.

In this case, the back yoke 126 is configured to enclose the permanent magnet 116, which is to prevent the permanent magnet 116 from being damaged by the stator in assembling the rotor and the stator together. In particular, it is able to prevent a rotation of the rotor from being interrupted by debris generated from the damaged permanent magnet. And, it is also able to prevent noise from being generated by the debris.

A portion for enclosing the permanent magnet is provided to a step sill 20 of a rotor frame on which the permanent magnet is loaded. So, a magnetic flux generated from an end portion of the permanent magnet flows into not only a stator frame but also the stator as a valid magnetic flux to prevent magnetic flux leakage.

Meanwhile, in case that the back yoke 126 is formed of a non-magnetic substance with a specific magnetic permeability below 100 in particular, it is able to have a magnetized pattern closer to a sine wave than that shown in FIG. 7.

In this case, the back yoke 126 can be formed of a flexible substance like the permanent magnet. And, the back yoke 126 can be formed by insert injection molding with the rotor frame.

For the rotor of the second embodiment of the present invention, the permanent magnet can be assembled to the back yoke after the back yoke has been assembled to the rotor frame. Alternatively, the back yoke can be assembled to the rotor frame after the permanent magnet has been assembled to the back yoke.

Of course, the back yoke can be configured in one body of the rotor frame by insert injection molding or the like. Alternatively, the back yoke is injected between the rotor frame and the permanent magnet to assemble the rotor frame and the permanent magnet together.

In this case, the rotor frame is preferably formed of a magnetic substance to form a magnetic path. More preferably, the rotor frame is formed by press processing of a steel plate or sheet. In particular, the sidewall part of the rotor frame substantially plays a role as a back yoke for forming a magnetic path and the back yoke of the non-magnetic substance does not play a role as the back yoke for forming the magnetic path.

Like the aforesaid first embodiment of the present invention, the second embodiment of the present invention enables a magnetized permanent magnet to be attached to the rotor frame. Alternatively, the permanent magnet can be magnetized after having been attached to the rotor frame. And, the permanent magnet can be magnetized in the same manner of the former description.

Figure 10:
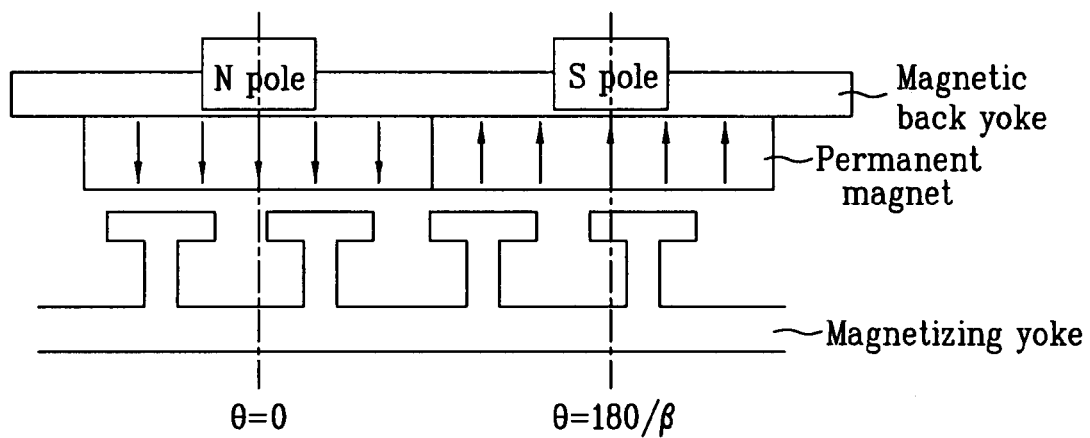
FIG. 10 is a schematic diagram of a magnetized pattern of a permanent magnet in magnetic body back yoke.
Figure 11:
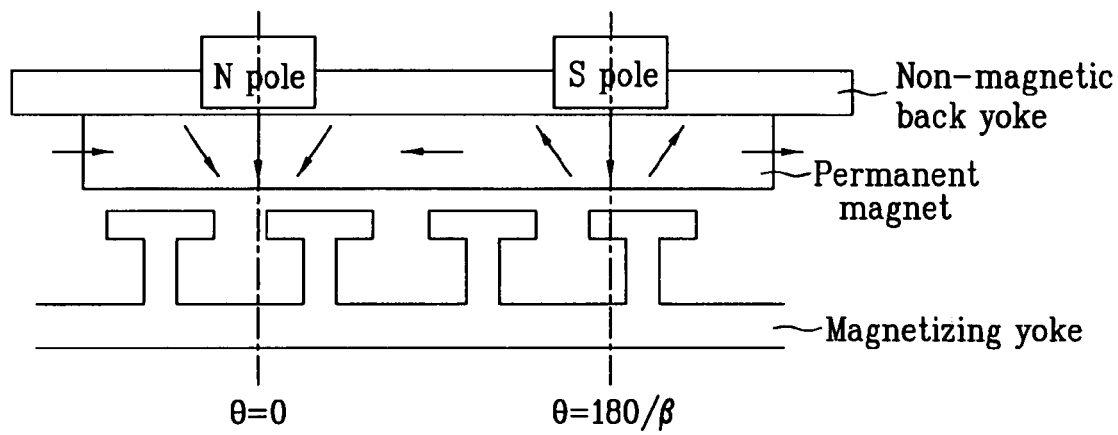
FIG. 11 is a schematic diagram of a magnetized pattern of a permanent magnet in non-magnetic body back yoke.

Explained in the following description with reference to FIG. 10 and FIG. 11 is how the magnetized patterns of the first and second embodiments of the present invention differ from each other.

FIG. 10 is a schematic diagram of a magnetized pattern of a permanent magnet in magnetic body back yoke and FIG. 11 is a schematic diagram of a magnetized pattern of a permanent magnet in non-magnetic body back yoke.

Referring to FIG. 10 and FIG. 11, a permanent magnet is magnetized via a magnetizing yoke enabling a pair of teeth to form one magnetic pole. In this case, 'β' indicates a number of magnetic poles of a permanent magnet to be magnetized.

The back yoke shown in FIG. 10 is formed of a magnetic substance, whereas the back yoke shown in FIG. 11 is formed of a non-magnetic substance. So, in magnetizing a permanent magnet via the magnetizing yoke, a magnetized pattern varies.

In case that the back yoke, as shown in FIG. 11, is formed of a non-magnetic substance, a corresponding magnetic permeability is very small to be easily penetrated by a magnetic line of force. So, a magnetic flux leaking from the permanent magnet vertically penetrates a center of a magnetic pole or both sides of the center of the magnetic pole by being outwardly bent.

So, if the back yoke is non-magnetic, a magnetized pattern of the permanent magnet can have a sine wave pattern. Of course, the lower the specific permeability of the back yoke gets, the closer to the sine wave pattern the magnetized pattern gets.

In case that the back yoke, as shown in FIG. 10, is formed of a magnetic substance, a specific permeability is very high. So, a magnetic flux leaking from the permanent magnet is unable to pass though the corresponding back yoke. In particular, the magnetic flux flows along the back yoke.

In other words, since the magnetic flux leaking from the permanent magnet flows along the back yoke instead of being outwardly bent centering on the center of the magnetic pole, a magnetized pattern takes after a square wave pattern.

A method of manufacturing a direct drive motor for a washing machine according to the present invention is explained as follows.

First of all, a method of manufacturing a direct drive motor for a washing machine according to the present invention includes a permanent magnet assembling step of assembling a flexible permanent magnet to a non-magnetic back yoke provided to an inner surface of a sidewall of a rotor frame in a circumferential direction and a permanent magnet magnetizing step of magnetizing the permanent magnet by inserting a magnetizing yoke within the rotor frame having the permanent magnet assembled thereto to form a plurality of magnetic poles in a sine wave pattern in a circumferential direction.

In this case, the non-magnetic back yoke can be removed. If the non-magnetic back yoke is removed, the permanent magnet is directly attached to an inner surface of the rotor frame.

The permanent magnet assembling step includes the steps of assembling the permanent magnet to an inner surface of the non-magnetic back yoke and assembling the back yoke assembled to the permanent magnet to an inner surface of a sidewall part of the rotor frame. In particular, after the permanent magnet has been attached to the back yoke, both of the back yoke and permanent magnet attached together are assembled to the rotor frame.

In the permanent magnet assembling step, the non-magnetic back yoke is injected in a circumferential direction to the inner surface of the sidewall part of the rotor frame between the permanent magnet provided to the inner surface of the sidewall part of the rotor frame in the circumferential direction and the rotor frame to assemble the rotor frame and the permanent magnet together.

Namely, the back yoke can be used as a member to assemble the rotor frame and the permanent magnet together.

Accordingly, the present invention provides the following effects or advantages.

First of all, since the motor has a weight lighter than that of a motor including a permanent magnet formed by sintering, it is able to reduce an energy loss attributed to inertia. Since a permanent magnet is fixed to a rotor frame more concretely, it is able to prevent the permanent magnet from spreading.

Secondly, square wave magnetization of a permanent magnet of a motor can converted to sine wave magnetization.

Hence, the present invention enhances efficiency of a direct drive type motor for a washing machine in a manner of decreasing vibration and noise by reducing the influences of cogging torque and harmonic wave.

Thirdly, a flexible permanent magnet is used to configure a strip shape. So, it is able to facilitate the permanent magnet to be attached to a rotor frame.

Fourthly, the present invention prevents a permanent magnet from being damaged by a back yoke in assembling a rotor and a stator together, thereby eliminating additional trivial noise due to permanent magnet debris and preventing the rotor from being interrupted by the permanent magnet debris.

Fifthly, the present invention enables a permanent magnet to be magnetized after having been attached to a rotor frame, thereby facilitating a motor to be manufactured.

Sixthly, the present invention enables a permanent magnet to have more magnetic poles using a flexible permanent magnet.

Seventhly, the present invention enables a permanent magnet to have sine wave magnetization due to a back yoke formed of a plastic based substance, thereby enhancing concentricity of a rotor frame.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A direct drive motor for a washing machine, comprising:
a stator having a winding part with a coil wound thereon;
a rotor frame including a sidewall part and a rear wall part, wherein the rotor frame is configured to be connected to a shaft so as to directly drive a drum coupled to the shaft;
a permanent magnet positioned at an inner side of the sidewall part of the rotor frame, wherein the permanent magnet is made of a resin material; and
a back yoke positioned between an inner circumferential surface of the sidewall part of the rotor frame and a corresponding outer circumferential surface of the permanent magnet, wherein the sidewall part of the rotor frame is made of a magnetic material so as to form a magnetic path and the back yoke is made of a non-magnetic material such that the permanent magnet is magnetized in a sine wave pattern circumferentially.

2. The direct drive motor of claim 1, wherein the back yoke is configured to cover the permanent magnet in a direction of an opening of a rotor in which the stator is inserted in order to prevent the permanent magnet from being damaged when the rotor and the stator are assembled together.

3. The direct drive motor of claim 1, wherein the back yoke encloses all of the permanent magnet except for a portion of the permanent magnet that faces the stator.

4. The direct drive motor of claim 1, wherein the back yoke is formed by insert injection molding of the rotor frame.

5. The direct drive motor of claim 1, wherein the permanent magnet comprises at least one band shaped permanent magnet made of a flexible material.

6. The direct drive motor of claim 5, wherein the permanent magnet is attached to an inner circumferential surface of the back yoke.

7. The direct drive motor of claim 5, wherein the permanent magnet comprises four band shaped permanent magnets.

8. The direct drive motor of claim 1, wherein the permanent magnet is formed of a polyamide or polyphenyl based synthetic resin.

9. The direct drive motor of claim 1, wherein the permanent magnet is formed of rare earth element.

* * * * *